US010089245B2

(12) United States Patent
Peacock et al.

(10) Patent No.: US 10,089,245 B2
(45) Date of Patent: Oct. 2, 2018

(54) MANAGEMENT OF ENCRYPTION KEYS FOR MULTI-MODE NETWORK STORAGE DEVICE

(71) Applicant: HEWLETT PACKARD ENTERPRISE DEVELOPMENT LP, Houston, TX (US)

(72) Inventors: John Kent Peacock, Menlo Park, CA (US); Tomasz Barszczak, San Jose, CA (US); Brian Rowe, San Jose, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 196 days.

(21) Appl. No.: 15/153,706

(22) Filed: May 12, 2016

(65) Prior Publication Data

US 2016/0342532 A1 Nov. 24, 2016

Related U.S. Application Data

(60) Provisional application No. 62/163,090, filed on May 18, 2015.

(51) Int. Cl.
| | |
|---|---|
| G06F 21/00 | (2013.01) |
| G06F 12/14 | (2006.01) |
| G06F 21/62 | (2013.01) |
| H04L 9/08 | (2006.01) |
| H04L 9/14 | (2006.01) |

(52) U.S. Cl.
CPC ...... *G06F 12/1408* (2013.01); *G06F 21/6218* (2013.01); *H04L 9/0822* (2013.01); *H04L 9/0894* (2013.01); *H04L 9/14* (2013.01); *G06F 2212/1052* (2013.01)

(58) Field of Classification Search
CPC .................................................. G06F 12/1408
USPC ............................................................ 713/193
See application file for complete search history.

(56) References Cited

U.S. PATENT DOCUMENTS

| | | | | |
|---|---|---|---|---|
| 6,807,649 | B1 | 10/2004 | Murthy | |
| 8,560,845 | B2 * | 10/2013 | Krsti | G06F 21/44 713/161 |
| 2008/0155680 | A1 * | 6/2008 | Guyot | G06F 21/80 726/17 |
| 2010/0082991 | A1 | 4/2010 | Baldwin et al. | |
| 2011/0022856 | A1 * | 1/2011 | Ureche | G06F 21/602 713/193 |

(Continued)

*Primary Examiner* — Harris C Wang

(57) ABSTRACT

One method for managing encryption includes identifying an available or a secure mode. During restarts a passphrase must be entered in secure mode but not in available mode. Further, a master key is created for encrypting volume keys, where master and volume encryption keys are not stored in non-volatile memory (NVRAM) nor in disk storage. A half-key is created by encrypting the master key with a secure key, the secure key and the encrypted volume encryption keys being stored in disk storage. The half-key is stored in NVRAM only in available mode but not in secure mode. The master key is recreated during a restart when operating in the available mode by decrypting the NVRAM half-key with the secure key from disk storage. Further, the passphrase must be entered by an operator to recreate the half-key and the master key during a restart in the secure mode.

20 Claims, 11 Drawing Sheets

(56) References Cited

U.S. PATENT DOCUMENTS

| | | |
|---|---|---|
| 2012/0243687 A1 | 9/2012 | Li et al. |
| 2013/0010966 A1* | 1/2013 | Li .................... H04L 9/085 380/278 |
| 2013/0177157 A1* | 7/2013 | Li .................... H04L 9/083 380/277 |
| 2013/0227262 A1* | 8/2013 | Maya ............... G06F 21/575 713/2 |
| 2016/0127128 A1* | 5/2016 | Chen ................ G04L 9/3247 713/189 |
| 2016/0342532 A1* | 11/2016 | Peacock ............ G06F 12/1408 |
| 2016/0344553 A1 | 11/2016 | Chen et al. |
| 2017/0288861 A1 | 10/2017 | Matthews |

* cited by examiner

MANAGEMENT OF ENCRYPTION KEYS FOR MULTI-MODE NETWORK STORAGE DEVICE

CLAIM OF PRIORITY

This application claims priority from U.S. Provisional Patent Application No. 62/163,090, filed May 18, 2015, and entitled "Management of Encryption Keys for Multi-Mode Network Storage Device." This provisional application is herein incorporated by reference.

BACKGROUND

1. Field of the Invention

The present embodiments relates to methods, systems, and programs for managing security in a network storage device.

2. Description of the Related Art

Network storage—also referred to as network storage systems, network storage devices, storage arrays, or simply storage systems—is computer data storage that is connected to a computer network and provides data access to heterogeneous clients. Typically, network storage systems process a large amount of Input/Output (IO) requests, and high availability, speed, and reliability are desirable characteristics of network storage.

Oftentimes, the storage system encrypts the data before permanently storing the data (e.g., in disk drives). For example, some government institutions required that the data on the disk be encrypted. This way, if the disk drives are stolen, the data stored in the drives is not compromised. It is critical for the security of the storage system to manage the encryption keys appropriately so the data is not compromised.

Some environments have highly secured physical access to the actual storage device, which means that there is not a serious concern that someone may steal the storage device. However, other environments may reside in remote physical locations that do not have reliable physical security to the storage device. If a malicious user steals the storage device and tries to access the data, it is imperative that the thief does not have access to the encryption keys for reading the stored data.

What is needed is a storage system that can be secured in data centers with controlled physical access protection, as well as in data centers without controlled physical access protection.

It is in this context that embodiments arise.

SUMMARY

Methods, devices, systems, and computer programs are presented for managing encryption keys in a network storage device. It should be appreciated that the present embodiments can be implemented in numerous ways, such as a method, an apparatus, a system, a device, or a computer program on a computer readable medium. Several embodiments are described below.

One general aspect includes a method for managing encryption keys in a network storage device is provided. The method includes an operation for identifying one of an available mode or a secure mode for a network storage device, where the available mode does not require entering a passphrase for restarts of the network storage device and the secure mode requires entering the passphrase for restarts. The network storage device includes a non-volatile memory and disk storage. The method also includes an operation for creating a master key used for encrypting volume keys in the network storage device, where the master key and the volume keys are not stored in the non-volatile memory nor in the disk storage. The method also includes creating a half key by encrypting the master key with a secure key, where the secure key and the encrypted volume keys are stored in the disk storage. The method also includes storing the half key in the non-volatile memory when operating in available mode and keeping the half key out of the non-volatile memory when operating in secure mode. The method also includes recreating the master key, during a restart when operating in the available mode, by decrypting the half key stored in the non-volatile memory with the secure key stored in disk storage. The method also includes requesting the passphrase to be entered by an operator, during a restart when operating in the secure mode, to recreate the half key and the master key.

One general aspect includes a network storage device including a non-volatile memory, disk storage, and a processor. The processor identifies one of an available mode or a secure mode, where the available mode does not require entering a passphrase for restarts of the network storage device and the secure mode requires entering the passphrase for restarts. The processor creates a master key used for encrypting volume keys in the network storage device, where the master key and the volume keys are not stored in the non-volatile memory nor in the disk storage. Further, the processor creates a half key by encrypting the master key with a secure key, where the secure key and the encrypted volume keys are stored in the disk storage. The processor stores the half key in the non-volatile memory when operating in available mode and keeps the half key out of the non-volatile memory when operating in secure mode. During a restart while operating in the available mode, the processor recreates the master key by decrypting the half key stored in the non-volatile memory with the secure key stored in disk storage. During the restart while operating in the secure mode, the processor requests the passphrase to be entered by an operator to recreate the half key and the master key.

One general aspect includes a non-transitory computer-readable storage medium storing a computer program. The computer-readable storage medium includes program instructions for identifying one of an available mode or a secure mode for a network storage device, where the available mode does not require entering a passphrase for restarts of the network storage device and the secure mode requires entering the passphrase for restarts, the network storage device including a non-volatile memory and disk storage. The storage medium further includes program instructions for creating a master key used for encrypting volume keys in the network storage device, where the master key and the volume keys are not stored in the non-volatile memory nor in the disk storage. The storage medium further includes program instructions for creating a half key by encrypting the master key with a secure key, where the secure key and the encrypted volume keys are stored in the disk storage, and program instructions for storing the half key in the non-volatile memory when operating in available mode and keeping the half key out of the non-volatile memory when operating in secure mode. The storage medium further includes program instructions for recreating the master key, during a restart when operating in the available mode, by decrypting the half key stored in the non-volatile memory with the secure key stored in disk storage. The storage medium further includes program instructions for requesting the passphrase to be entered by an operator, during a restart when operating in the secure mode, to recreate the half key and the master key.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, devices, systems, and computer programs for managing encryption keys in a network storage device. Embodiments presented herein provide for two operational modes for a network storage device: available mode and secure mode. In the available mode, encryption-key data is stored in a non-volatile memory, and when the storage device is restarted while operating in available mode, the storage device is able to resume operations by configuring the encryption management using the encryption key data stored in the non-volatile memory. This means, that no human intervention is required to restart the storage device while in available mode.

In the secure mode, some of the encryption-key data is not stored in non-volatile memory, and when the storage device is restarted in secure mode, the data stored in the non-volatile memory (or disk) is not sufficient to restart the encryption management system. Therefore, in secure mode, it is necessary that the user enter a passphrase (or some other security token) to restart encryption in the storage device. This means, that human intervention is required to restart the storage device while in secure mode. It also means, that it is not possible to access the encrypted data in the storage device without entering the passphrase, even if a malicious actor has access to the disk data and the non-volatile data stored in the device.

It will be apparent, that the present embodiments may be practiced without some or all of these specific details. In other instances, well-known process operations have not been described in detail in order not to unnecessarily obscure the present embodiments.

Figure 1A:
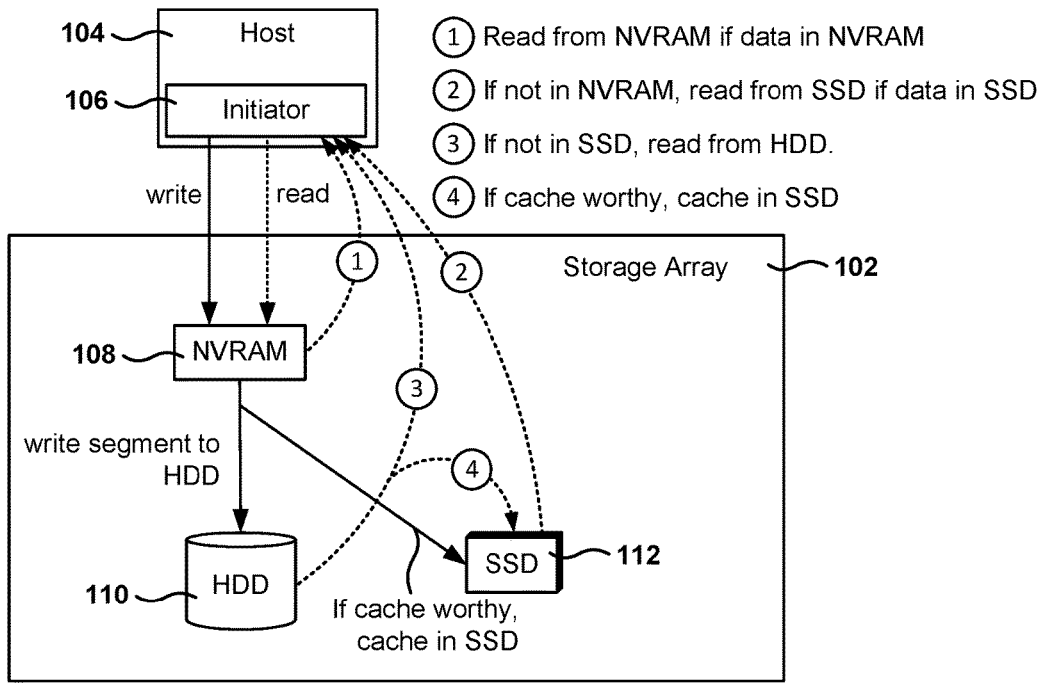
FIGS. 1A-1B illustrate the read and write paths within the storage array, according to several embodiments.
Figure 1B:
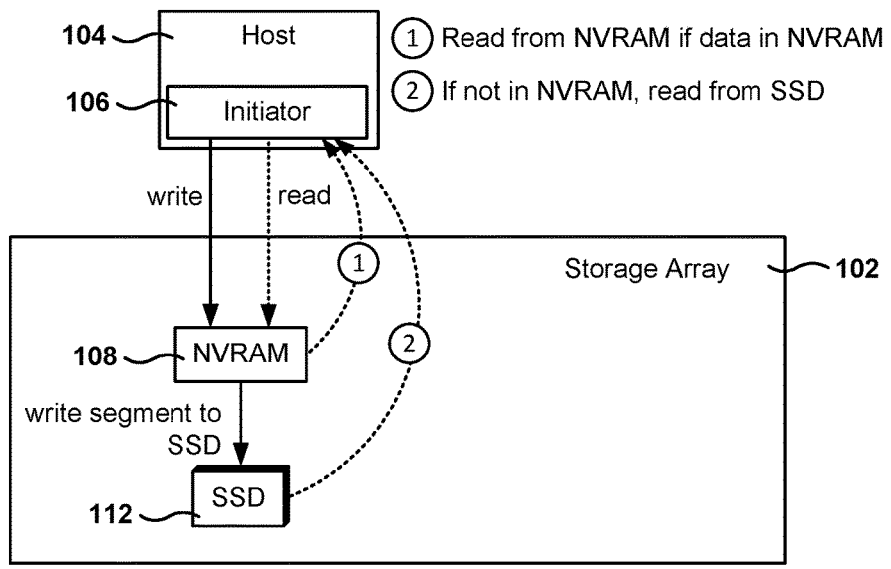

FIGS. 1A-1B illustrate the read and write paths within the storage device, according to several embodiments. FIG. 1A shows the write path for a hybrid system with SSDs and HDDs, where the initiator 106 in the host 104 sends the write request to the storage array 102. As the write data comes in, the write data is written into NVRAM 108, and an acknowledgment is sent back to the initiator (e.g., the host or application making the request). In one embodiment, storage array 102 supports variable block sizes. Data blocks in the NVRAM 108 are grouped together to form a segment that includes a plurality of data blocks, which may be of different sizes. The segment is compressed and then written to HDD 110. In addition, if the segment is considered to be cache-worthy (i.e., important enough to be cached or likely to be accessed again) the segment is also written to the solid state drive (SSD) cache 112. In one embodiment, the segment is written to the SSD 112 in parallel while writing the segment to HDD 110.

In one embodiment, the performance of the write path is driven by the flushing of NVRAM 108 to disk 110. With regards to the read path, the initiator 106 sends a read request to storage array 102. The requested data may be found in any of the different levels of storage mediums of the storage array 102. First, a check is made to see if the data is found in RAM (not shown), which is a shadow memory of NVRAM 108, and if the data is found in RAM then the data is read from RAM and sent back to the initiator 106. In one embodiment, the shadow RAM memory (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the shadow RAM then a check is made to determine if the data is in cache, and if so (i.e., cache hit), the data is read from the flash cache 112 and sent to the initiator 106. If the data is not found in the NVRAM 108 nor in the flash cache 112, then the data is read from the hard drives 110 and sent to the initiator 106. In addition, if the data being served from hard disk 110 is cache worthy, then the data is also cached in the SSD cache 112.

FIG. 1B illustrates the read and write paths for an all-flash array having SSDs for permanent storage and no HDDs. The write path includes writing the incoming data to NVRAM 108 and later saving the data in SSD 112. The read path is also simplified as compared to the hybrid system of FIG. 1A, where the data is read from NVRAM 108 if available in NVRAM, and if the data is not found in NVRAM 108 then the data is read from SSD 112.

Figure 2:
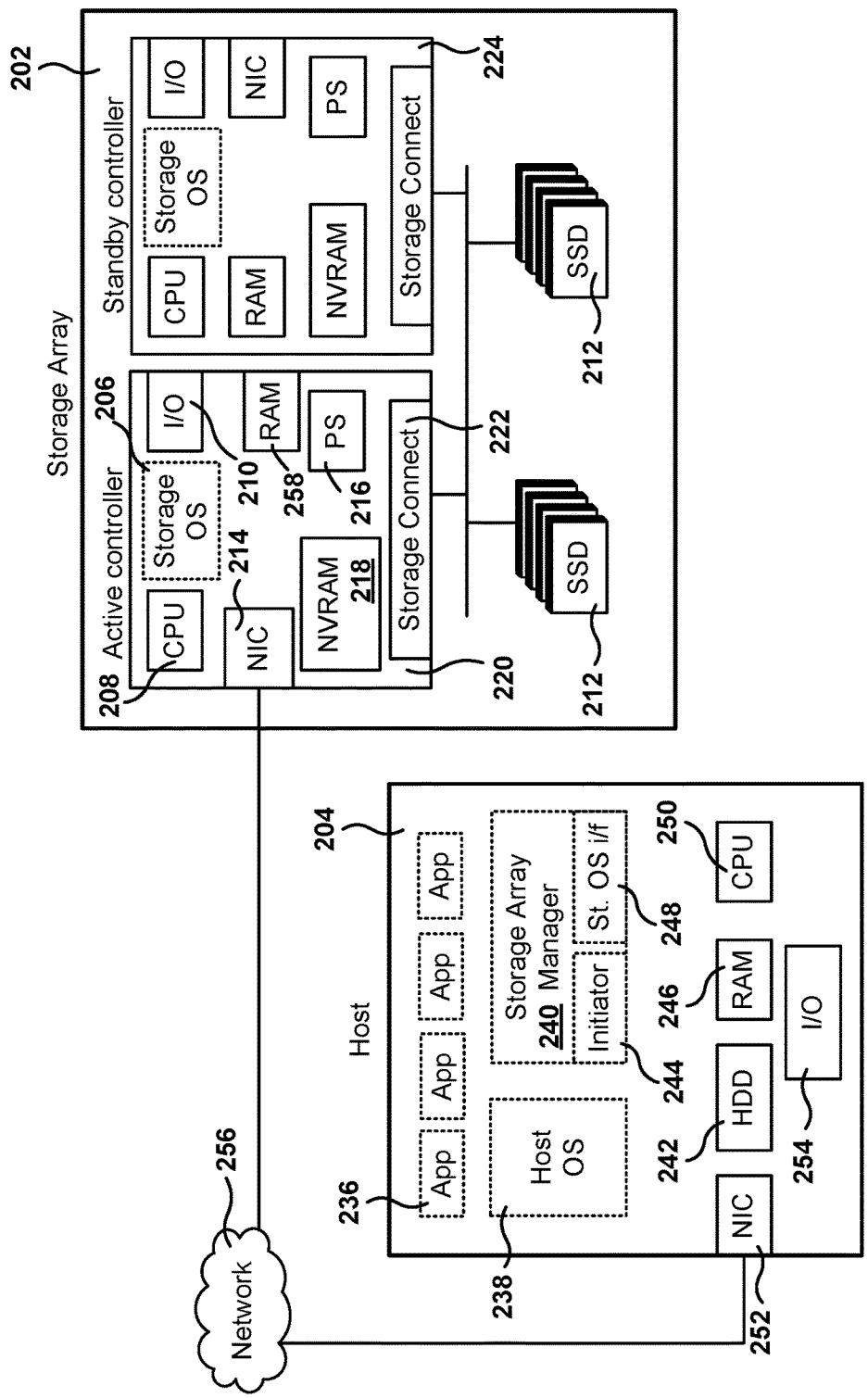
FIG. 2 illustrates the architecture of an all-flash storage array, according to one embodiment.

FIG. 2 illustrates the architecture of an all-flash storage device, according to one embodiment. In one embodiment, all-flash storage array 202 includes an active controller 220, a standby controller 224, and one or more SSDs 212. In one embodiment, the controller 220 includes non-volatile RAM (NVRAM) 218, which is for storing the incoming data as the data arrives to the storage array. After the data is processed (e.g., compressed and organized in segments (e.g., coalesced)), the data is transferred from the NVRAM 218 to SSD 212.

In addition, the active controller 220 further includes CPU 208, general-purpose RAM 212 (e.g., used by the programs executing in CPU 208), input/output module 210 for communicating with external devices (e.g., USB port, terminal port, connectors, plugs, links, etc.), one or more network interface cards (NICs) 214 for exchanging data packages through network 256, one or more power supplies 216, a temperature sensor (not shown), and a storage connect module 222 for sending and receiving data to and from SSD 212. In one embodiment, standby controller 224 includes the same components as active controller 220.

Active controller 220 is configured to execute one or more computer programs stored in RAM 258. One of the computer programs is the storage operating system (OS) used to perform operating system functions for the active controller device. In some implementations, one or more expansion shelves may be coupled to storage array 202 to increase storage capacity.

Active controller 220 and standby controller 224 have their own NVRAMs, but they share SSDs 212. The standby controller 224 receives copies of what gets stored in the NVRAM 218 of the active controller 220 and stores the copies in its own NVRAM. If the active controller 220 fails, standby controller 224 takes over the management of the storage array 202. When servers, also referred to herein as hosts, connect to the storage array 202, read/write requests (e.g., IO requests) are sent over network 256, and the storage array 202 stores the sent data or sends back the requested data to host 204.

Host 204 is a computing device including a CPU 250, memory (RAM) 246, permanent storage (HDD) 242, a NIC card 252, and an IO module 254. The host 204 includes one or more applications 236 executing on CPU 250, a host operating system 238, and a computer program storage array manager 240 that provides an interface for accessing storage array 202 to applications 236. Storage array manager 240 includes an initiator 244 and a storage OS interface program 248. When an IO operation is requested by one of the applications 236, the initiator 244 establishes a connection with storage array 202 in one of the supported formats (e.g., iSCSI, Fibre Channel, or any other protocol). The storage OS interface 248 provides console capabilities for managing the storage array 202 by communicating with the active controller 220 and the storage OS 206 executing therein.

To process the IO requests, resources from the storage array 202 are required. Some of these resources may be a bottleneck in the processing of storage requests because the resources are over utilized, or are slow, or for any other reason. In general, the CPU and the hard drives of the storage array 202 can become over utilized and become performance bottlenecks. For example, the CPU may become very busy because the CPU is utilized for processing storage IO requests while also performing background tasks, such as garbage collection, snapshots, replication, alert reporting, etc. In one example, if there are many cache hits (i.e., the SSD contains the requested data during IO requests), the SSD cache, which is a fast responding system, may press the CPU for cycles, thus causing potential bottlenecks for other requested IOs or for processing background operations.

For purposes of discussion and understanding, reference is made to CASL as being an algorithm processed by the storage OS. However, it should be understood that optimizations, modifications, additions, and subtractions to versions of CASL may take place from time to time. As such, reference to CASL should be understood to represent exemplary functionality, and the functionality may change from time to time, and may be modified to include or exclude features referenced herein or incorporated by reference herein. Still further, it should be understood that the embodiments described herein are just examples, and many more examples and/or implementations may be defined by combining elements and/or omitting elements described with reference to the claimed features.

In one embodiment, it should be understood that the "block level processing" of SSDs 212 is different than "instruction level processing," which is a common function in microprocessor environments. In one example, microprocessor environments utilize main memory, and various levels of cache memory (e.g., L1, L2, etc.). Instruction level caching, is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

Figure 3A:
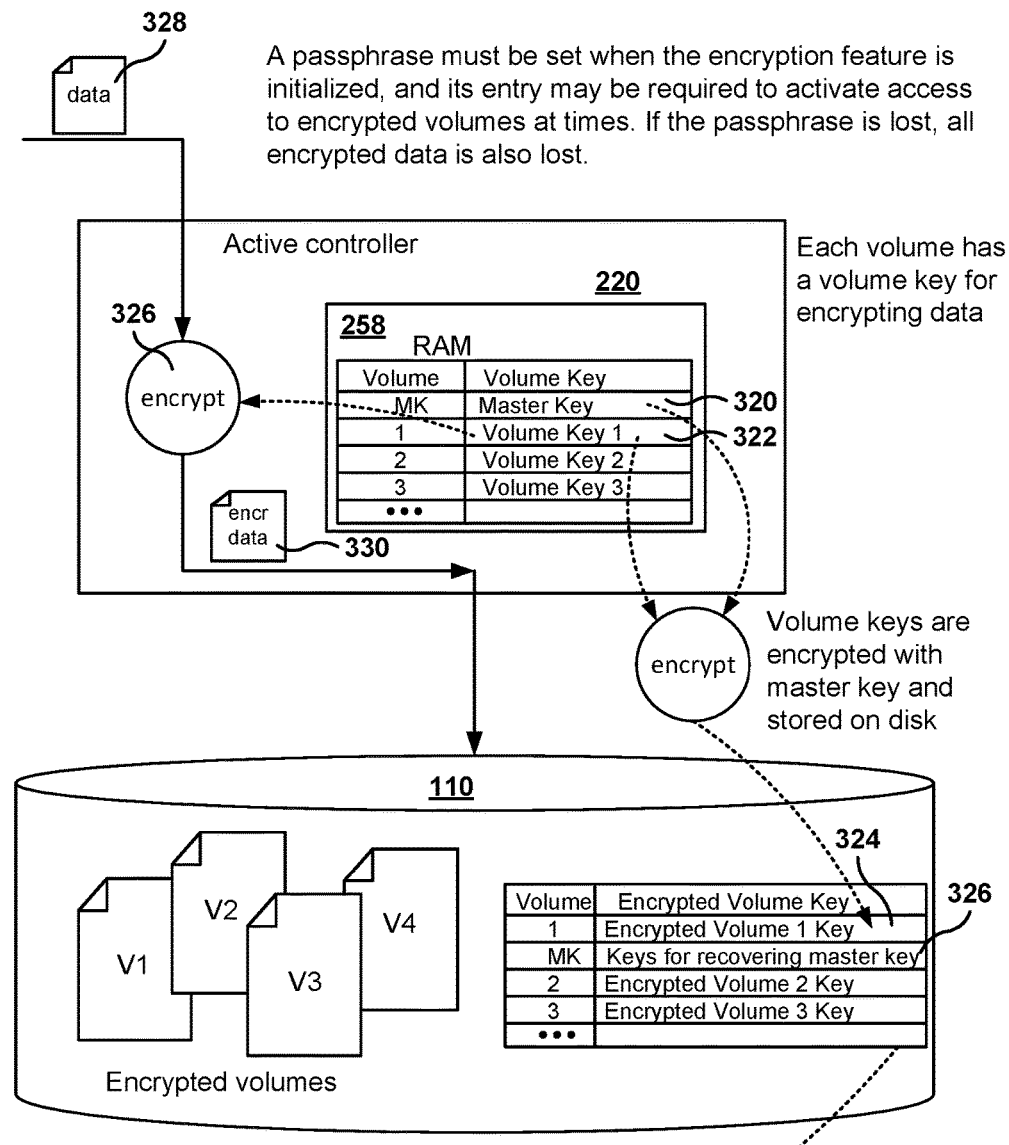
FIG. 3A illustrates the use of master keys and volume keys, according to one embodiment.

FIG. 3A illustrates the use of master keys and volume keys, according to one embodiment. In one embodiment, encryption is a per-volume attribute, meaning that each volume has its own encryption key. During initialization of encryption in the array, the user enters a passphrase used to recover a master key, which is then used to recover volume keys after a restart. A passphrase must be set when the encryption feature is initialized, and its entry may be required to activate access to encrypted volumes at times. If the passphrase is lost, all encrypted data is also lost. Accordingly, the passphrase may be utilized to recover the volume key for a plurality of volumes, although each volume may have its own volume encryption key. The operator also decides if the array will operate in secure mode or in available mode.

At volume-creation time, the operator decides if the volume will be encrypted. Each new encrypted volume, including clones, gets assigned a new encryption key. If the volume is encrypted, clones of the volume are also encrypted. Further, in one embodiment, if an operator wants to encrypt an existing volume that is not encrypted, the volume is copied to a new volume that is encrypted. This way, administrators are able to add encryption to a volume that wasn't previously encrypted.

When encryption is initialized for an array, a master key is generated, and the master key is used to encrypt volume keys. The master key is encrypted using the passphrase supplied during initialization. In one embodiment, if the passphrase is not entered after an array restart, then there is no access to encrypted volumes. In some embodiments, the encryption passphrase is between 8 and 64 printable characters, but longer or shorter passphrases are also possible. In general, long passphrases are more secure and easier to remember than short, random passwords.

If the passphrase is lost or forgotten, the data loss is permanent and the volume data will not be able to be accessed. Further, encryption keys are never written to disk in the clear, i.e., directly without some form of encryption. Wrapping keys are generated and used to encrypt keys sent between arrays in a group, and between replication partners. All keys (master, wrapping, and volume) are stored in encrypted form in a single database table on disk.

The active controller 220 keeps a table in RAM 258 with the volume keys 322, which means that if the array is reinitialized, the active controller needs to recover the volume keys to continue support for volume encryption.

Neither the volume keys nor the master keys 320 are stored on disk 110. Instead, the volume keys are stored 324 in disk 110 (or in SSD for an all-flash array) in encrypted form 324 after being encrypted with the master key. In addition, keys 326 for recovering the master key are also stored on disk 110.

When a write request 328 is received by the storage array, the controller reads the volume key for the volume associated with the write request 328, and then the write request 328 is encrypted 326 resulting in encrypted data 330. The encrypted data 330 is then stored in disk. In a read, the reverse process takes place. The data is read from disk, decrypted with the volume key, and then the unencrypted data is transmitted to the requesting host.

During a restart, the master key is recovered using the passphrase or information kept in NVRAM, depending on the security mode, as discussed in more detail below. After this, the volume keys can be recovered using the master key.

Figure 3B:
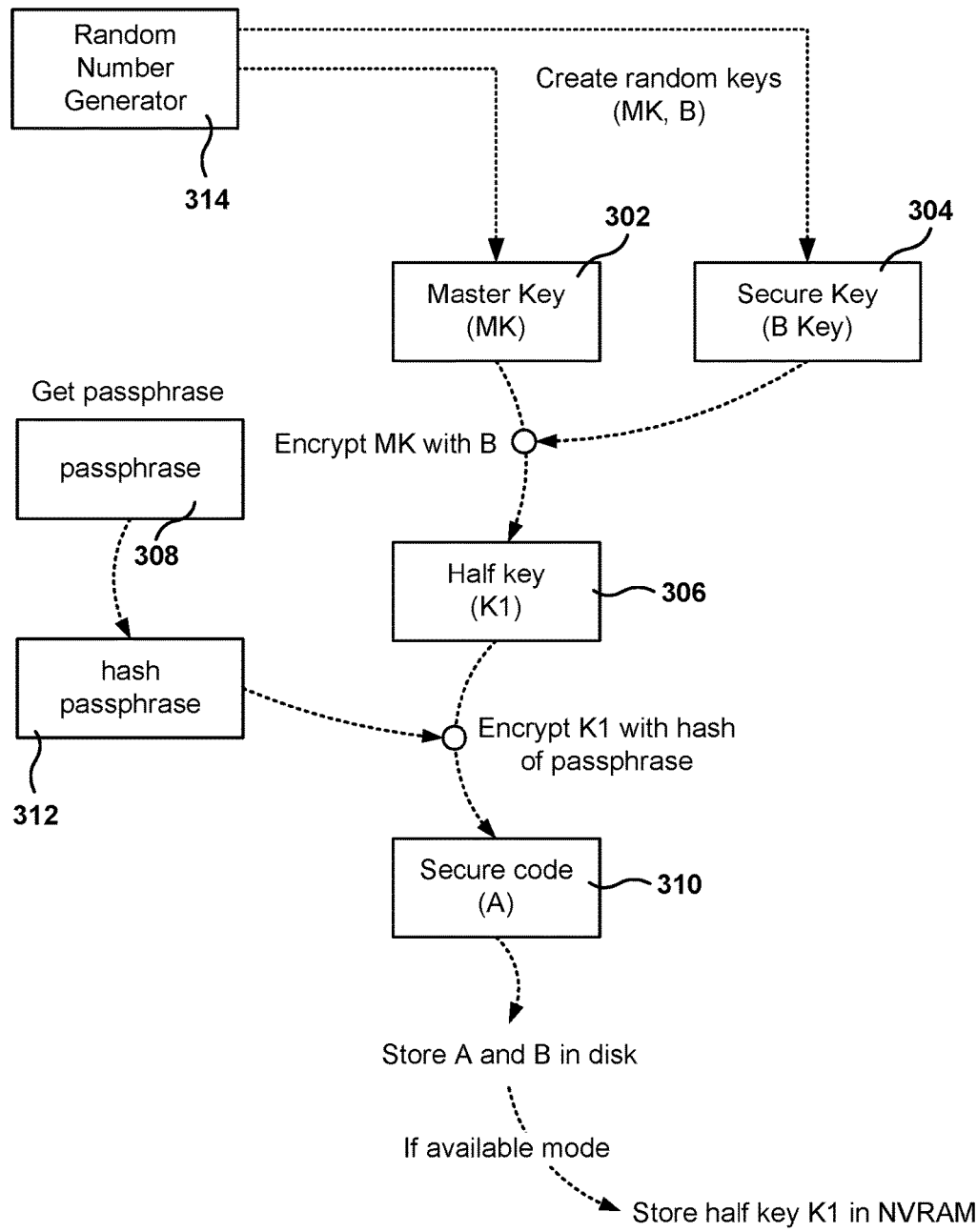
FIG. 3B illustrates the generation of security parameters, according to one embodiment.

FIG. 3B illustrates the generation of security parameters, according to one embodiment. If the storage device is restarted in available mode, the storage device can be restarted without human intervention, because the storage device is able to reconstruct the encryption keys required to operate the storage device with encryption. It is noted that the master key and the volume encryption keys necessary to decrypt the data in the storage device are not stored in disk storage or NVRAM. Therefore, the master key and the volume encryption keys have to be reconstructed (i.e., recovered) after a restart. This way, a malicious user that gains physical access to the storage device would not be able to decrypt the data just by examining the information in disk storage or any other permanent storage.

However, if the storage device is operating in secure mode, critical encryption information is not stored on the disk or the non-volatile memory, and the storage device is not able to be restarted without human intervention, which requires a user to enter a passphrase or password, or some other type of security token, such as biometric security, use of a software key or a hard key, etc. Embodiments are described herein with reference to a passphrase, but other embodiments may utilize other types of security that require a person to perform a security operation, such as using a key, using a biometric authentication device, etc.

In one embodiment, the non-volatile memory is a RAM or DRAM memory, that would otherwise be volatile, but that is connected to a power supply such that, even if the device where the memory is installed loses power (e.g., A.C. power) or is powered down, the memory will keep its content without loss. For example, the power supply for the memory may be a battery, or a rechargeable battery, or an uninterruptible power supply (UPS), or a removable battery, or a capacitor able to hold a charge for a predetermined amount of time, or the power supply of the device, or any other type of power supply that will keep the memory powered, even when the device where the memory is installed is powered off. For example, the non-volatile memory may still be connected to the power supply of the device, even when the device is powered off. Additionally, embodiments presented herein may also be used with any type of non-volatile memory that can retain the memory contents when the storage device is power off, such as an SSD.

Some companies want the option of operating the storage device in available mode or in secure mode. Typically, the available mode is used in data centers with physical security, so the risk of losing the storage device to a malicious entity is minimized because of the physical security provided to the data center. In this case, data center managers do not want to be bothered if there is a power outage, having to reenter passphrases for all the network storage devices.

However, some companies may use a network storage device in a location that does not have good physical security (e.g., located at a data center from a third-party provider or some other business associate of the company). In this case, it is desirable to operate the storage device in secure mode, so if the storage device is lost or stolen, it wouldn't be possible to access the encrypted data just by examining the permanent storage of the device.

The encryption system utilizes several parameters for managing encryption. When the device is initiated, a random number generator 314 creates a master key 302 and a secure key 304, also referred to as the B key. In one embodiment, the encryption keys described herein are 256 bit long, but other any key size may be utilized. A volume encryption key is a key used to encrypt/decrypt data for a volume, and a master key is an encryption key used to encrypt/decrypt the volume encryption keys. In some embodiments, FIPS-approved algorithms AES-256-KeyWrap and AES-256-XTS are utilized.

The master key 302 is encrypted with secure key 304 to obtain a new key referred to herein as half key 306 or K1. Further, the first time the encryption system is initialized, a passphrase 308 is obtained from the administrator. Then, half key 306 is encrypted with a hash 312 of passphrase 308 to obtain a secure code 310 (also referred to as A).

Secure key 304 and secure code 306 are stored in disk. If the storage device is operating in available mode, the half key 306 is also stored in non-volatile memory, but if the storage device is operating in secure mode then the half key 306 is not stored in the non-volatile memory.

When the storage device is rebooted, half key 306, secure key 304, and secure key 304 are used to recover the master key and the volume encryption keys. If in available mode, the half key 306 is read from the non-volatile memory, since the contents of the non-volatile memory are not lost during reboot. If in secure mode, the passphrase is requested from the user to calculate the half key 306. More details are provided below with reference to FIGS. 5 and 7 for the process of regenerating the master key and the volume keys after a restart.

Figure 3C:
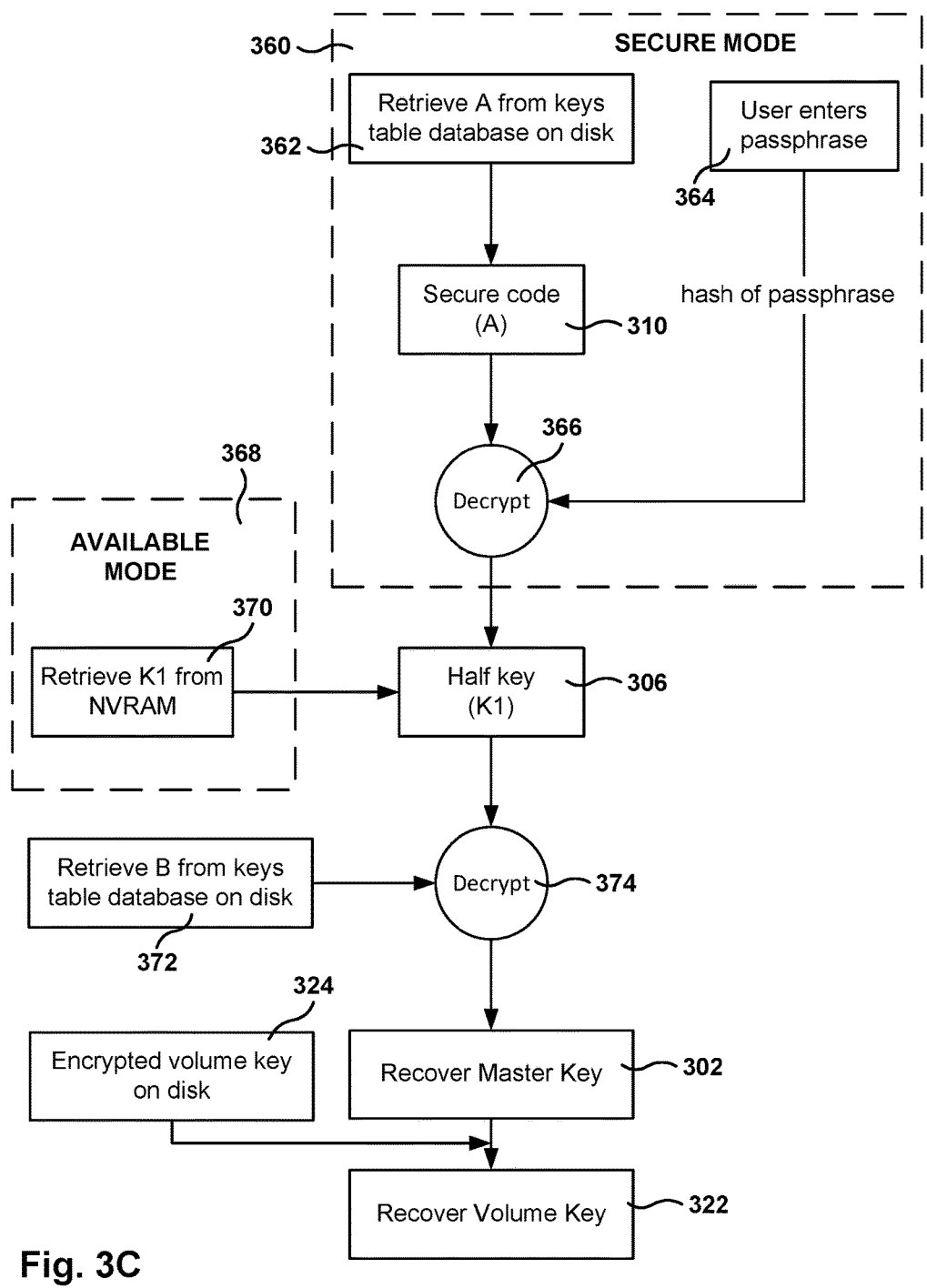
FIG. 3C illustrates the recovery process in available mode and secure mode, according to one embodiment.

FIG. 3C illustrates the recovery process in available mode and in secure mode, according to one embodiment. After a restart in secure mode 360, the A key 310 associated with the master key is retrieved 362 from the database on disk. Further, since the array is operating in secure mode, the passphrase is requested from the operator, and after the passphrase 364 is input, a hash of the passphrase is created. In operation 366, the A key 310 is decrypted 366 with the hash of the passphrase to obtain the half key (K1) 306.

Further, the B key is retrieved 372 from the database on disk storage (or SSD for an all-flash array), and the half key K1 is decrypted 374 with B to obtain the master key 302, which is then stored in the RAM of the controller. For any volume associated with the recovered master key, the encrypted volume key 324 is read from disk and then the encrypted volume key is decrypted with the master key to recover the volume key 322. The volume key is stored in RAM, and the array is now ready to proceed with the encryption and decryption of volume data.

In the available mode 368, it is not necessary to request the passphrase from the user. Instead, the half key K1 is retrieved from NVRAM 370. Once the half Key K1 is recovered from NVRAM, the remainder of the operations is the same as in the secure-mode restart process.

Figure 4:
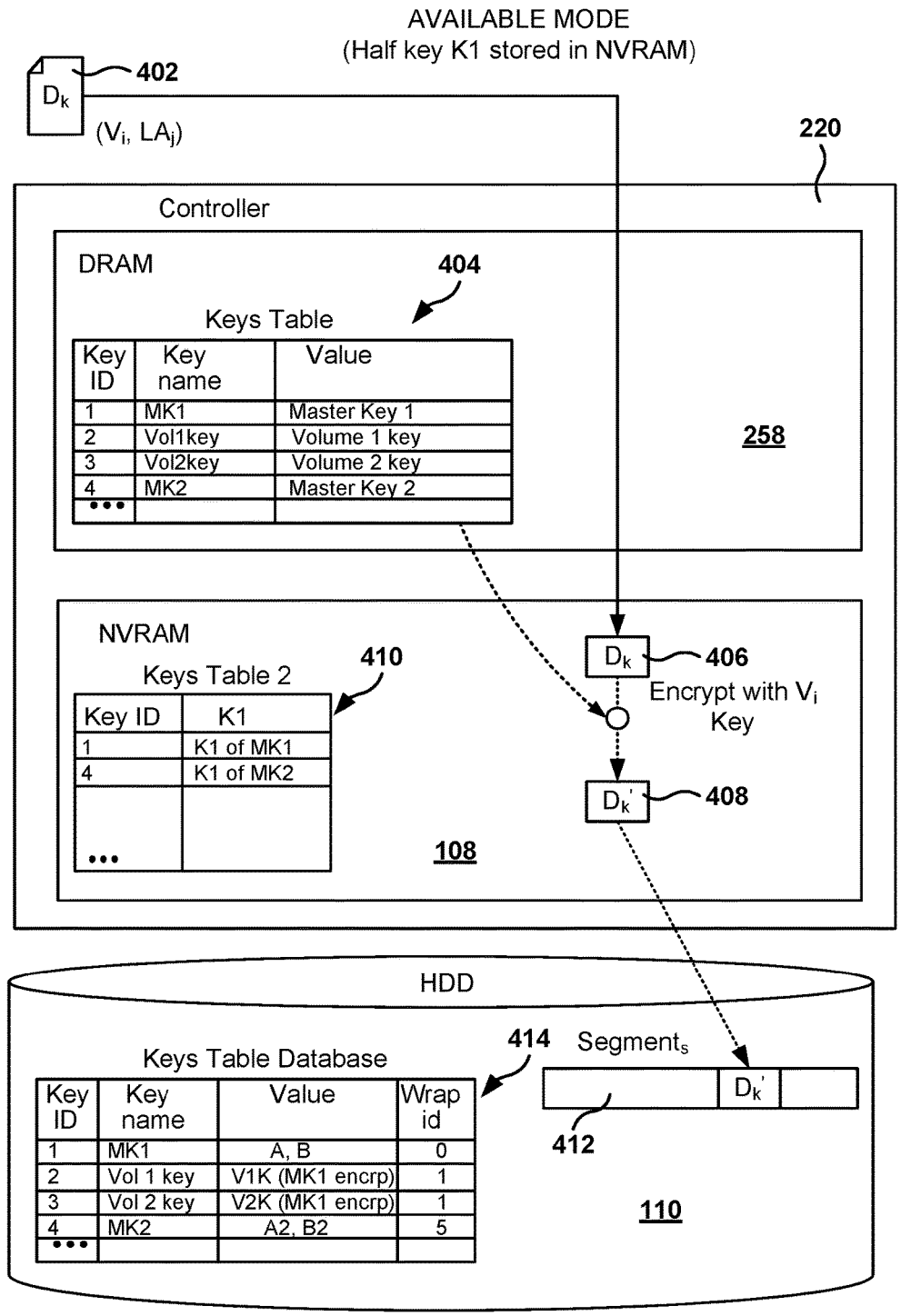
FIG. 4 illustrates the processing of a write request by the network storage device operating in available mode, according to one embodiment.

FIG. 4 illustrates the processing of a write request by the network storage device operating in available mode, according to one embodiment. In one embodiment, the storage device controller 220 includes DRAM 258, NVRAM 108, and HDD 110, but the same principles may be used for an all-flash array.

In one embodiment, the data within the storage device is organized in volumes (e.g., a logical drive), where each volume is a single accessible storage area. A write request 402 for a data block $D_k$ 402 includes a volume identifier $V_i$ and a logical address $LA_j$, which is the offset within the volume.

In one embodiment, the storage device includes a different volume encryption key for each volume in the storage device that is encrypted. For protection, a volume encryption key is encrypted with a master key.

Several tables with encryption data are stored in the different memories, and these tables are referred to herein as keys tables. The keys tables hold encryption key data used for encrypting and decrypting the data stored in the storage device.

Keys table database 414 is stored in HDD 110, and includes entries associated with a master key or with a volume key. In one embodiment, keys table database 414 is an SQL database, but any type of database may be used for practicing the embodiments described herein. An entry for a master key in keys table database 414 includes a key ID (e.g., 1), a master key name (e.g., MK1), secure code A, and secure key B.

In one embodiment, keys table database 414 includes the following fields:

KeyUId—unique UID for the key.
Name—the name of the key, which depends on its type.
keyid—the local key identifier within the key domain (a volume family for encryption keys).
BranchUId—the active branch UID for which this key was created (for volume keys)
type—the type of the key, which determines the interpretation of the name. The type may be one of a master key, a wrapping key (used to wrap other keys), a volume encryption key (used to encrypt data blocks), an array wrapping key (a wrapping key used to wrap keys sent to member arrays), or a replication wrapping key (a wrapping key used to wrap keys sent to a replication partner).
cipher, keylen, key—the encrypted key, with its cipher and its length
state—state of the key, e.g., active or inactive.
wrapping KeyUId—the UID of a key with which this key is wrapped, normally the master key.
prevkey—the keyid of the previously allocated key in the volume family, e.g., in a clone it would point to the parent volume's key entry.

In one embodiment, an entry for a volume key in keys table database 414 includes the key ID (e.g., 2), a volume key name (e.g., "Vol 1 key"), the volume encryption key encrypted with the master key (e.g., encrypted with master key MK1), and a wrap ID that indicates the entry in keys table database for the corresponding master key. It is noted that there could be one or more master keys in the storage device (e.g., MK1 and MK2). When a volume is created and encryption is desired for the volume, a volume key is created at random and then encrypted with a master key. The encrypted volume key is then stored in keys table database 414.

It is noted that keys table database 414 does not include any unencrypted encryption keys, therefore, if a malicious attack takes place, it is not possible to obtain the encryption keys by direct examination of the data in the hard disk.

Keys table 404 is stored in DRAM 258, and keys table 404 is used to store the encryption keys in the clear. i.e., without encryption. In one embodiment, keys table 404 includes entries for master keys or for volume encryption keys. In another embodiment, keys table 404 may include some of the data stored in keys table database 414 or keys table 2 410.

When data block $D_k$ 402 is received with a write request, the data block $D_k$ is stored in NVRAM 108 and encrypted 406 using the volume key for the corresponding volume $V_i$, resulting in encrypted data block $D_k'$ 408. The encrypted data block $D_k'$ 408 is transferred to HDD 110. In one embodiment, a segment 412 is formed by adding together a group of data blocks, including $D_k'$ 408, and the segment 412 is then stored in HDD 110.

Keys table 410 is stored in NVRAM 108, and each entry includes a key ID and the corresponding half key K1 for a master key. The half key is used during restart to recover the master key as described in more detail below with reference to FIG. 5.

Since the master key and the volume keys are only stored in DRAM 258, if the storage device is powered off or rebooted, the master key and the volume keys have to be recovered because the contents of the DRAM are not available after the device is powered off.

If a malicious user gains access to the storage device after the storage device has been powered off, the malicious user won't be able to decrypt encrypted data. Even if the malicious user had complete access to the device (e.g., root access), including access to the HDD 110, the malicious user would not be able to decrypt the data in HDD 110, because the malicious user would not have the volume encryption keys for decrypting the data nor the master key.

It is noted that the embodiments illustrated in FIG. 4 are exemplary. Other embodiments may utilize different data structures, different storage disks (e.g., SSDs), store additional data in the keys table, encrypt data blocks in NVRAM, etc. The embodiments illustrated in FIG. 4 should therefore not be interpreted to be exclusive or limiting, but rather exemplary or illustrative.

Figure 5:
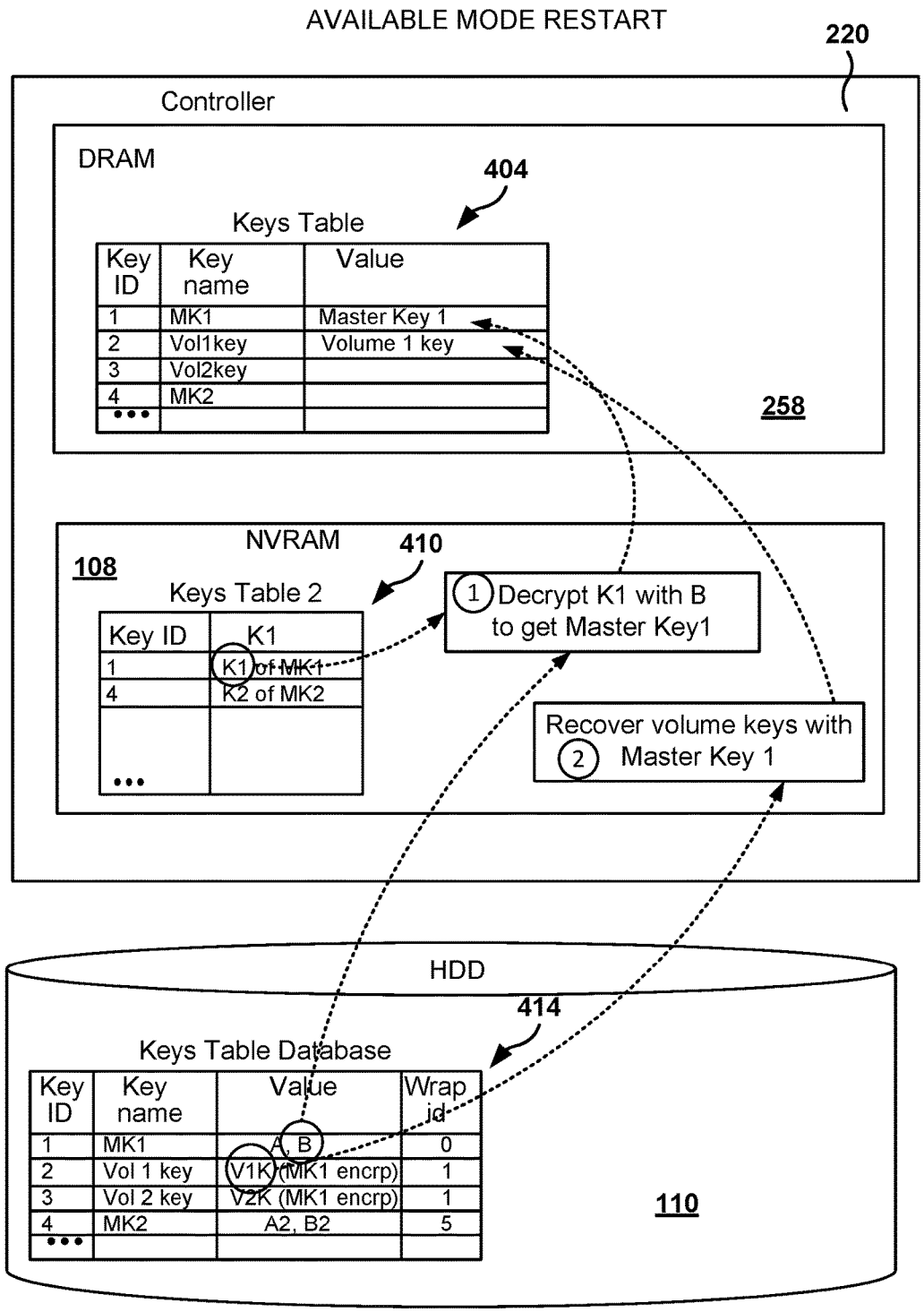
FIG. 5 illustrates the management of security parameters when the network storage device is restarted while in available mode, according to one embodiment.

FIG. 5 illustrates the management of security parameters when the network storage device is restarted while in available mode, according to one embodiment. When the storage device is restarted in available mode, the keys table 2 410 from NVRAM and the keys table database 414 in HDD are available because both are permanent storage media.

First, the master key is recovered and then the volume encryption keys are recovered with the master key. To recover the master key, the secure key B for the master key is read from keys table database 414, and the half key K1 is read from keys table 2 in NVRAM. Then, half key K1 is decrypted with secure key B to get the master key, which is then stored in DRAM. As seen in FIG. 3, half key K1 is the result of encrypting the master key MK with the secure key B, therefore, the reverse operation of decrypting half key K1 returns the master key MK.

Once the master key is recovered, the volume encryption keys of volumes associated with the master key are recovered by reading the encrypted volume keys from keys table database 414 and then decrypting the encrypted volume keys with the master key. The recovered volume encryption keys are then stored in keys table 404. Since the encryption keys have been recovered, encryption for the storage device is operational without requiring user intervention.

It is noted that it isn't possible to reconstruct the master key from the contents of disk alone, because the master key is not in disk, and the half key K1, needed to recuperate the master key, is not in disk either.

Figure 6:
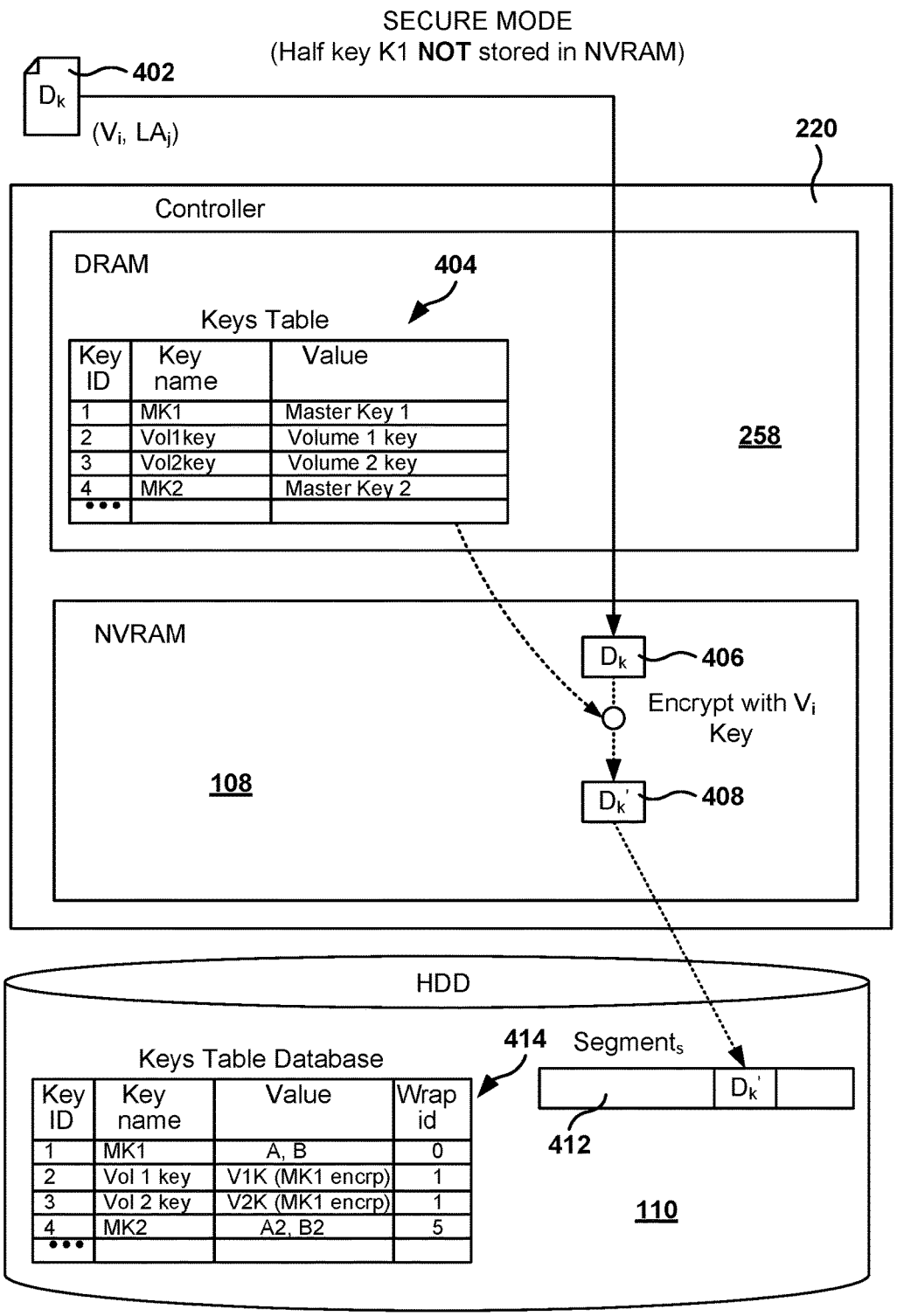
FIG. 6 illustrates the processing of a write request by the network storage device operating in secure mode, according to one embodiment.

FIG. 6 illustrates the processing of a write request by the network storage device operating in secure mode, according to one embodiment. In this embodiment, the write operation of $D_k$ is the same as in FIG. 4 above. One difference is between secure mode and available mode, whereby the half key K1 is not stored in NVRAM 108. Again, the processing of the incoming data blocks, and its encryption is the same as described with reference to FIG. 4.

As discussed above with reference to FIG. 5, to start encryption of the storage device after a reboot, the half key K1, recovered from the contents of NVRAM 108, is necessary to reconstruct the master key. However, in secure mode the half key K1 is not available in NVRAM 108, therefore, a different encryption restart method is necessary to restart a storage device operating in secure mode.

Figure 7:
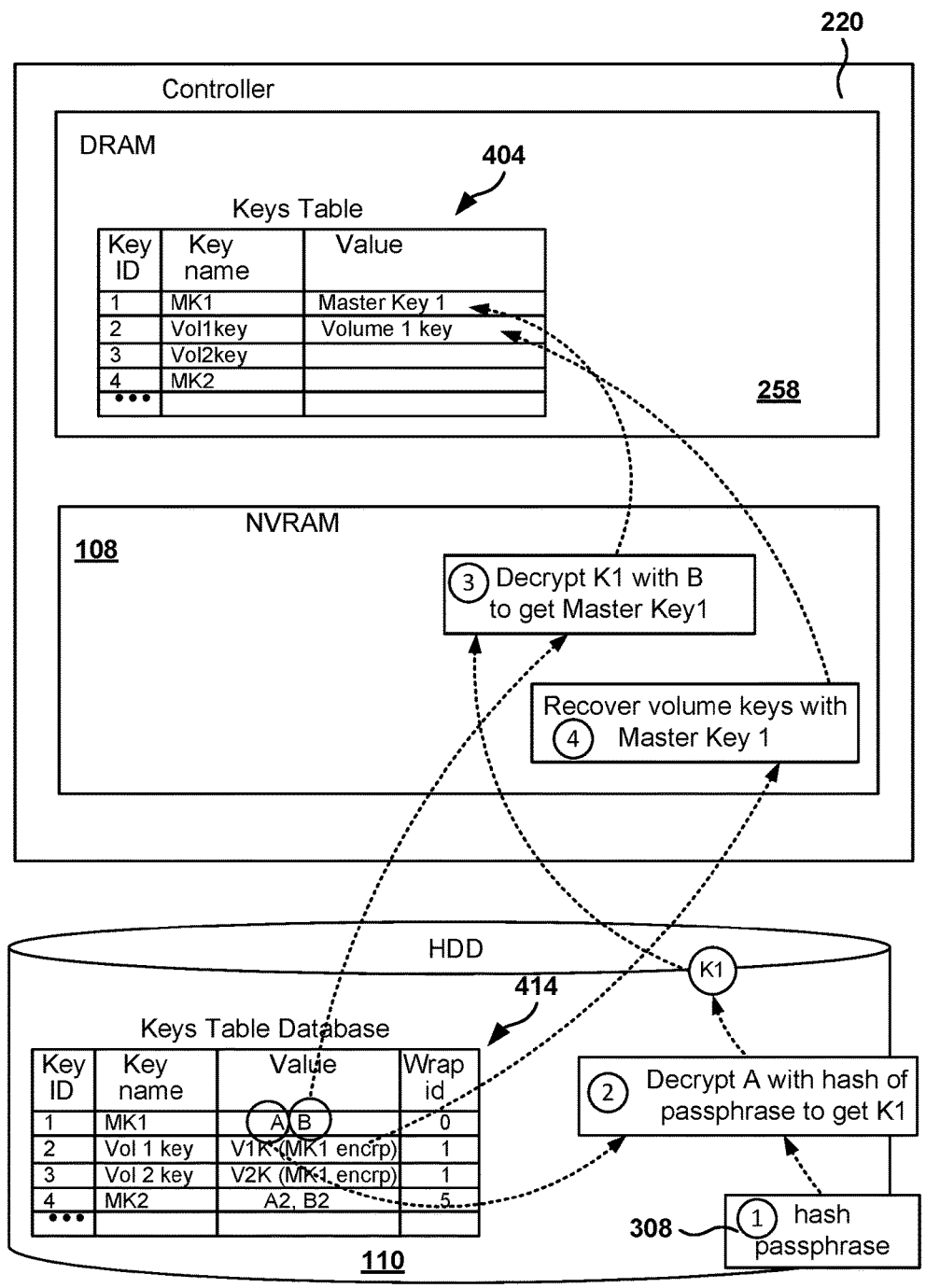
FIG. 7 illustrates the management of security parameters when the network storage device is restarted while in secure mode, according to one embodiment.

FIG. 7 illustrates the management of security parameters when the network storage device is restarted while in secure mode, according to one embodiment. After a restart in secure mode, the passphrase 308 is requested from the user, for example via input entered on a keyboard. In another embodiment, instead of the passphrase, other type of security mechanism may be used to obtain a passphrase or equivalent that requires an action by the storage device administrator. Embodiments presented herein are described with reference to a passphrase, but any other type of security token may be used.

After the user enters a passphrase, the passphrase is hashed 308. To recover the master key, the secure code A is read from keys table database 414, and secure code A is decrypted with the hash on the passphrase to obtain the half key K1. As described above with reference to FIG. 3B, secure code A is the result of encrypting the half key K1 with the hash of passphrase 308. Therefore, the reverse operation results in the recovery of the half key K1.

After the half key K1 is recovered, the process to recover the master key and the volume encryption keys is the same as the one described in FIG. 5 for the available mode restart. That is, half key K1 is decrypted with the secure key B to recover the master key, and once the master key is recovered, the associated volume encryption keys are decrypted after being read from keys table database 414.

Figure 8:
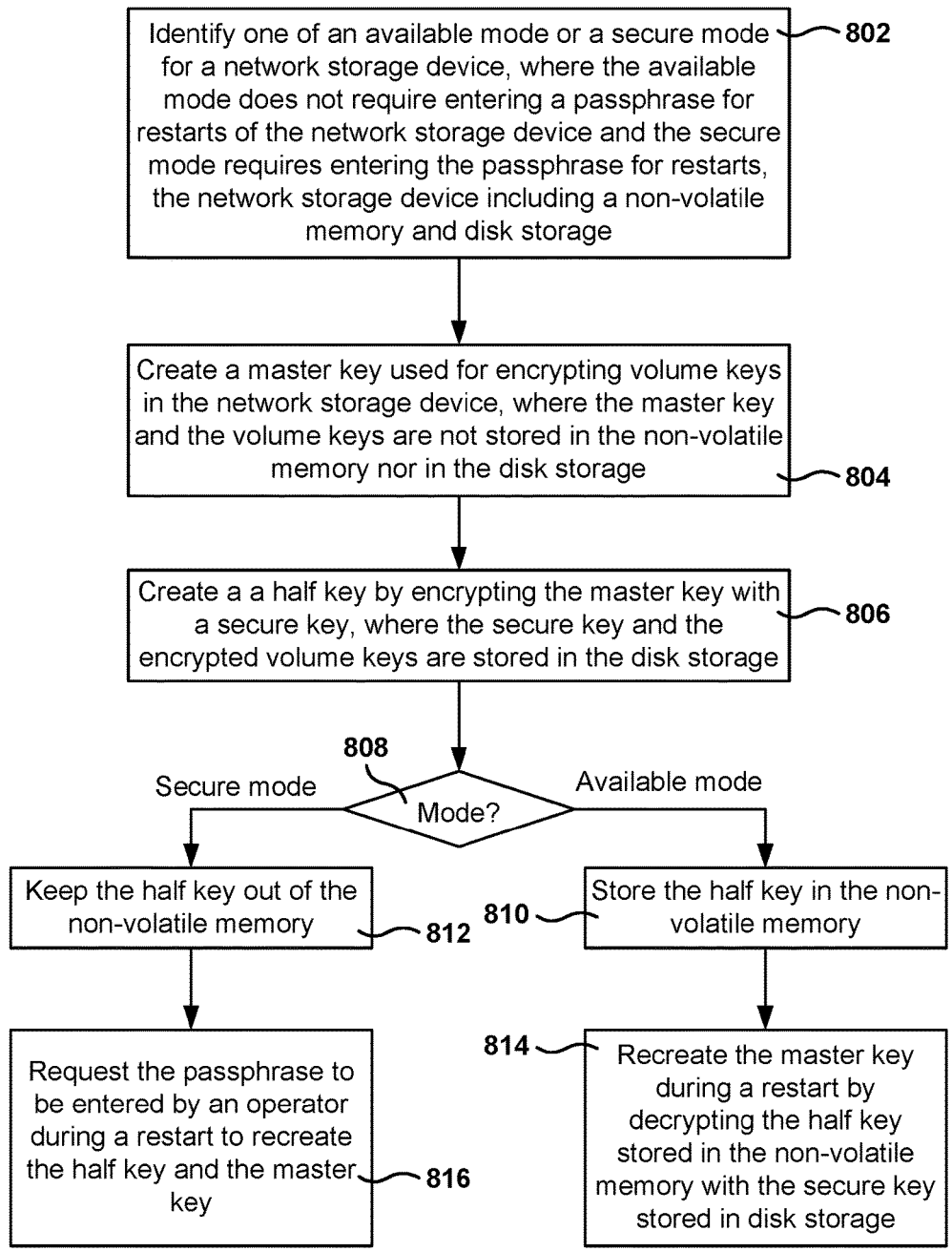
FIG. 8 is a flow chart for managing encryption keys in a network storage device, according to one embodiment.

FIG. 8 is a flow chart for managing encryption keys in a network storage device, according to one embodiment. While the various operations in this flowchart are presented and described sequentially, one of ordinary skill will appreciate that some or all of the operations may be executed in a different order, be combined or omitted, or be executed in parallel.

Operation 802 is for identifying one of an available mode or a secure mode for a network storage device, where the available mode does not require entering a passphrase for restarts of the network storage device and the secure mode requires entering the passphrase for restarts. The network storage device includes a non-volatile memory and disk storage, among other components.

From operation 802, the method flows to operation 804 for creating a master key used for encrypting volume encryption keys in the network storage device. The master key and the volume encryption keys are not stored in the non-volatile memory nor in the disk storage.

From operation 804, the method flows to operation 806 for creating a half key by encrypting the master key with a secure key, where the secure key and the encrypted volume keys are stored in the disk storage. For example, in one embodiment the half key is obtained by encrypting the master key with a secure key, as described above with reference to FIG. 3.

From operation 806, the method flows to operation 808 where a check is made to determine if the storage device is operating in secure mode or in available mode. If the storage device is operating in secure mode, the method flows to operation 812, and if the storage device is operating in available mode, the method flows to operation 810.

In operation 812, for the secure mode, the half key is kept out of the non-volatile memory, i.e., the half key is not stored in the non-volatile memory. See for example, FIG. 6. From operation 812, the method flows to operation 816, where the passphrase is requested to be entered by an operator during a restart to recreate the half key and the master key. See for example FIG. 7, and the corresponding description.

In operation 810, for available mode, the half key is stored in the non-volatile memory. See for example, FIG. 4 and the corresponding description. From operation 810, the method flows to operation 814, where the master key is recreated during a restart by decrypting the half key stored in the non-volatile memory with the secure key stored in disk storage.

Figure 9:
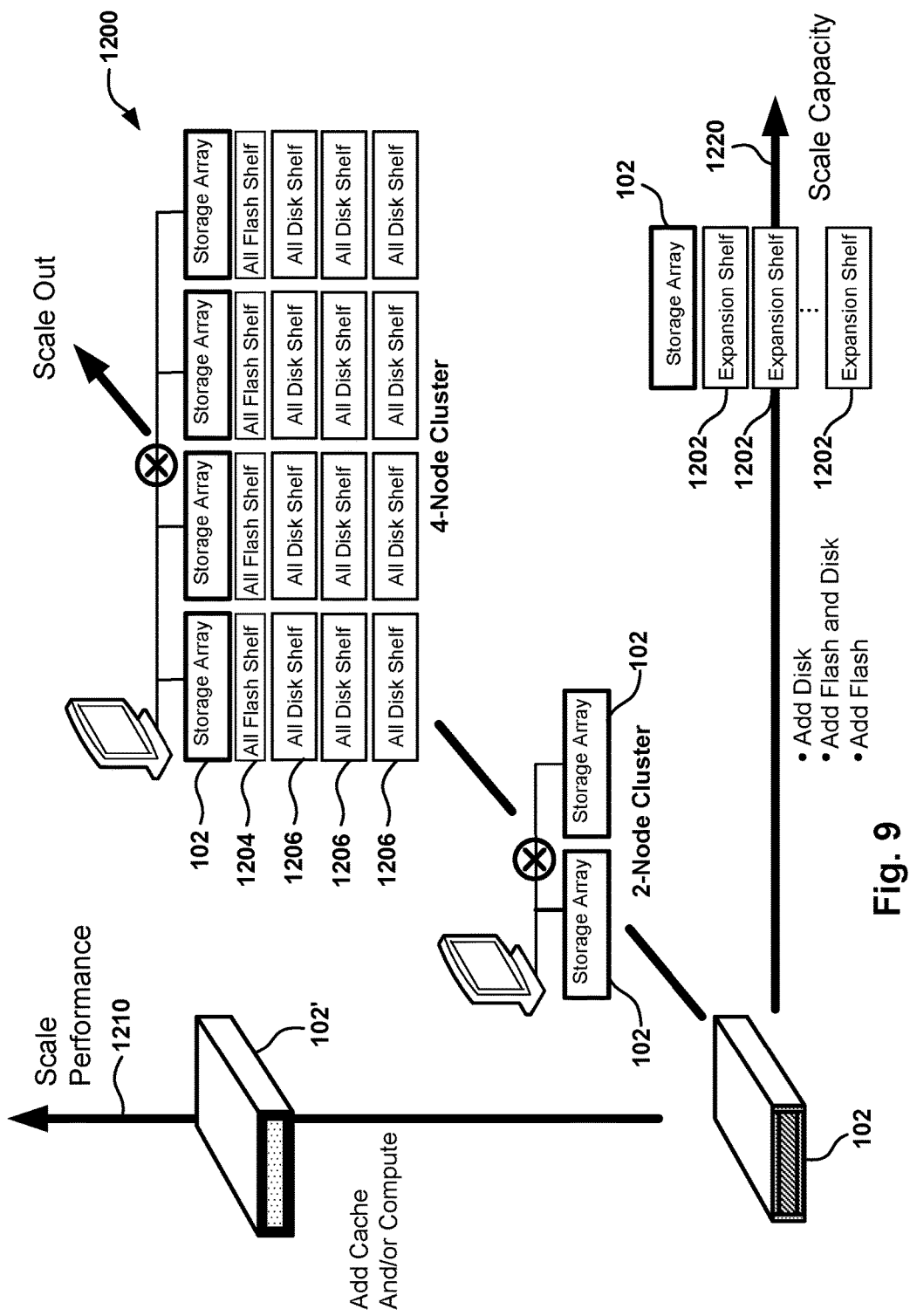
FIG. 9 is an example of the flexibility of the storage array, which can be expanded for scaling performance and for scaling capacity.

FIG. 9 is an example of the flexibility of the storage array, which can be expanded for scaling performance 1210 and for scaling capacity 1220. In this illustration, the storage array can be adjusted to add cache and/or compute resources to define a more powerful storage array 102. In one example, instead of upgrading the storage array 102, an upgraded storage array 102 can take its place to provide additional processing power (e.g., more powerful CPUs, higher capacity NVRAM, higher capacity DRAM, improved storage enclosure routing and buses, improved fan speeds, modified enclosure (e.g., chassis) heights (U1, U2, U3, etc.), different power supplies, and/or other redundancy and/or memory and/or processing infrastructure.

In one embodiment, if the storage array requires additional disk or storage or flash storage memory, the storage array can be expanded to scale out 1200 by adding expansion shelves 1202 to the storage array 102. As discussed above, the expansion shelves 1202 may be defined by all-disk shelves (ADS) or all-flash shelves (AFS), or combinations of ADS and AFS shelves In a further example, the flexibility of the storage array 102 is shown by its ability to be clustered into various sizes, which take into consideration both the scaling of performance and the scaling of capacity, which is referred to herein as "scaling-out" or "scale-out" of the storage array implementation. As shown, if additional processing power is required and additional storage capacity is required, storage arrays can be clustered together, such as to define a two-node cluster. In other embodiments, if an increased level of storage is required and processing power, multiple storage arrays can be clustered together, such as in the example of a four-node cluster.

The four-node cluster is provided such that each storage array is expanded by an all flash shelf 1204 and various all-disk shelves 1206. In some embodiments, fewer all-disk shelves can be coupled to each of the arrays that are clustered together. In still other embodiments, some clustered arrays may not be included in all flash shelves but only additional one or more of all-disk shelves. Still further, some embodiments may be more symmetric such as the four-node cluster example shown in FIG. 9.

Thus, the embodiments described herein enable the scaling of capacity and performance beyond the physical limitations of a single storage array by seamlessly clustering any combination of storage hybrid arrays. An advantage of clustering is that performance can be managed to avoid capacity silos and performance hotspots, and enables easy management of all hardware resources across the cluster as a single storage entity.

In one embodiment, as mentioned above, the storage OS that executes a storage algorithm is capable of taking thousands of point-in-time instant snapshots of volumes by creating a copy of the volumes' indices. Any updates to existing data or new data written to a volume are redirected to free space. In one example implementation, no performance impact due to snapshot processing is taken, as snapshots take little incremental space when only changes are maintained. This also simplifies restoring snapshots, as no data needs to be copied.

Other embodiments are also provided, wherein some or all of the snapshots can be entirely and uniquely taken, wherein no incremental type snapshot is processed. Thus, it should be understood that a variety of implementations and modifications can be made and still enable the snapshot management to be processed by the storage OS of the storage array 102, in accordance with one or more embodiments. In another embodiment, processing by the storage OS enables efficient replication of data to another array by transferring compressed, block-level changes only. These remote copies can be made active if the primary array becomes unavailable. This makes deploying disaster data recovery easy and affordable—especially over a WAN to a remote array where bandwidth is limited.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments.

What is claimed is:

1. A method comprising:
identifying one of an available mode or a secure mode for a network storage device, wherein the available mode does not require entry of a security token for restarts of the network storage device and the secure mode requires entry of the security token for restarts of the network storage device, the network storage device including a non-volatile memory and drive storage, separate from the non-volatile memory, and comprising at least one storage drive;
creating a master key used for encrypting volume keys in the network storage device, wherein the master key and the volume keys are not stored in the non-volatile memory nor in the drive storage;
creating a half key by encrypting the master key with a secure key, wherein the secure key and the encrypted volume keys are stored in the drive storage;
storing the half key in the non-volatile memory when operating in the available mode and keeping the half key out of the non-volatile memory when operating in the secure mode;
recreating the master key, during a restart of the network storage device when operating in the available mode, by decrypting the half key stored in the non-volatile memory with the secure key stored in disk storage; and
during a restart of the network storage device when operating in the secure mode:
requesting entry of the security token;
recovering the half key using the security token; and
recovering the master key using the half key.

2. The method of claim 1, further comprising:
encrypting the half key with a hash of the security token to obtain a secure code; and
storing the secure code in the drive storage.

3. The method of claim 2, wherein the half key is not stored in the drive storage, and wherein during a restart the master key cannot be recovered utilizing exclusively information stored in the drive storage.

4. The method of claim 2, further comprising:
during the restart when operating in the secure mode;
decrypting the secure code with the hash of the security token to recover the half key; and
recovering the master key by decrypting the half key with the secure key.

5. The method as recited in claim 1, further comprising:
creating the secure key with a random number generator.

6. A network storage device comprising:
a non-volatile memory;
drive storage, separate from the non-volatile memory, and comprising at least one storage drive; and
a processor to execute instructions stored on a non-transitory computer-readable storage medium to:
identify one of an available mode or a secure mode, wherein the available mode does not require entry of a security token for restarts of the network storage device and the secure mode requires entry of the security token for restarts of the network storage device;
create a master key used for encrypting volume keys in the network storage device, wherein the master key and the volume keys are not stored in the non-volatile memory nor in the drive storage;
create a half key by encrypting the master key with a secure key, wherein the secure key and the encrypted volume keys are stored in the drive storage;

store the half key in the non-volatile memory when operating in the available mode and keep the half key out of the non-volatile memory when operating in the secure mode;

during a restart while operating in the available mode, recreate the master key by decrypting the half key stored in the non-volatile memory with the secure key stored in drive storage; and during a restart while operating in the secure mode:
request entry of the security token;
recover the half key using the security token; and
recover the master key using the half key.

7. The network storage device of claim 6, wherein the processor is to execute the instructions to encrypt the half key with a hash of the security token to obtain a secure code, and store the secure code in the drive storage.

8. The network storage device of claim 7, wherein the half key is not stored in the drive storage, and wherein during a restart the master key cannot be recovered utilizing exclusively information stored in the drive storage.

9. The network storage device of claim 7, wherein during the restart while operating in the secure mode, the processor is to execute the instructions to:
decrypt the secure code with the hash of the security token to recover the half key; and
recover the master key by decrypting the half key with the secure key.

10. The network storage device of claim 7, wherein the processor is to execute the instructions to:
after a restart, recover the volume keys by decrypting, with the master key, the encrypted volume keys in the drive storage.

11. The network storage device of claim 7, wherein the network storage device is able to become operational after a restart without requiring user input when operating in the available mode;
wherein the network storage device requires user input to become operational after a restart when operating in the secure mode.

12. A non-transitory computer-readable storage medium comprising instructions executable by a processor to:
identify one of an available mode or a secure mode for a network storage device, wherein the available mode does not require entry of a security token for restarts of the network storage device and the secure mode requires entry of the security token for restarts of the network storage device, the network storage device including a non-volatile memory and drive storage, separate from the non-volatile memory, and comprising at least one storage drive;
create a master key used for encrypting volume keys in the network storage device, wherein the master key and the volume keys are not stored in the non-volatile memory nor in the drive storage;
create a half key by encrypting the master key with a secure key, wherein the secure key and the encrypted volume keys are stored in the drive storage;
store the half key in the non-volatile memory when operating in the available mode and keep the half key out of the non-volatile memory when operating in the secure mode;
recreate the master key, during a restart when operating in the available mode, by decrypting the half key stored in the non-volatile memory with the secure key stored in the drive storage; and
during a restart when operating in the secure mode:
request entry of the security token;
recover the half key using the security token; and
recover the master key using the half key.

13. The storage medium of claim 12, wherein the instructions are executable by the processor to:
encrypt the half key with a hash of the security token to obtain a secure code; and
store the secure code in the drive storage.

14. The storage medium of claim 13, wherein the half key is not stored in the drive storage, and wherein during a restart the master key cannot be recovered utilizing exclusively information stored in the drive storage.

15. The method of claim 1, wherein the drive storage comprises at least one hard disk drive (HDD), at least one solid state drive (SSD), or at least one HDD and at least one SSD.

16. The method of claim 1, wherein the security token comprises a passphrase or password.

17. The network storage device of claim 6, wherein the drive storage comprises at least one hard disk drive (HDD), at least one solid state drive (SSD), or at least one HDD and at least one SSD.

18. The network storage device of claim 6, wherein the security token comprises a passphrase or password.

19. The non-transitory computer-readable storage medium of claim 12, wherein the drive storage comprises at least one hard disk drive (HDD), at least one solid state drive (SSD), or at least one HDD and at least one SSD.

20. The storage medium of claim 12, wherein the security token comprises a passphrase or password.

* * * * *